United States Patent
Lee et al.

(10) Patent No.: US 8,533,752 B2
(45) Date of Patent: Sep. 10, 2013

(54) DEVICE AND METHOD FOR HIERARCHICAL BROADCASTING

(75) Inventors: Keunsik Lee, Seoul (KR); Byung Sun Kim, Seoul (KR); Chang-Seob Park, Seoul (KR); Sang-Jin Hahm, Seoul (KR); In-Joon Cho, Seoul (KR)

(73) Assignee: Korean Broadcasting System, Seoul (KR)

( * ) Notice: Subject to any disclaimer, the term of this patent is extended or adjusted under 35 U.S.C. 154(b) by 186 days.

(21) Appl. No.: 13/255,491

(22) PCT Filed: Mar. 16, 2010

(86) PCT No.: PCT/KR2010/001608
§ 371 (c)(1),
(2), (4) Date: Sep. 8, 2011

(87) PCT Pub. No.: WO2010/107220
PCT Pub. Date: Sep. 23, 2010

(65) Prior Publication Data
US 2012/0042333 A1 Feb. 16, 2012

(30) Foreign Application Priority Data
Mar. 16, 2009 (KR) .................. 10-2009-0022233

(51) Int. Cl.
*H04N 7/167* (2011.01)

(52) U.S. Cl.
USPC ............. 725/31; 725/86; 725/87; 725/88; 725/89; 725/90; 725/91; 725/92; 725/93; 725/94; 725/95

(58) Field of Classification Search
USPC ............ 725/31, 86–104, 148; 375/240
See application file for complete search history.

(56) References Cited

U.S. PATENT DOCUMENTS
2006/0039480 A1 2/2006 Seo
2008/0056356 A1 3/2008 Wang et al.

FOREIGN PATENT DOCUMENTS
KR 10-2006-0017973 A 2/2006
KR 10-0681914 B1 2/2007
WO 2008/007342 A2 1/2008

OTHER PUBLICATIONS

In Seong Hwang, In Kyu Park and Hoo Jong Kim; "Digital Broadcasting System and Method Using Different Types of Networks for Effectively Using Limited RF Resources"; Korean Patent Abstracts; Publication No. 100681914 B1 A; Publication Date: Feb. 6, 2007; Korean Intellectual Property Office, Republic of Korea.
Kwang Deok Seo; "Apparatus and a Method of Transmitting Images for Constructing a Simple Image Transmitting System"; Korean Patent Abstracts; Publication No. 1020060017973 A; Publication Date: Feb. 28, 2006; 2 Pgs.; Korean Intellectual Property Office, Republic of Korea.
PCT International Search Report of International Searching Authority with English Translation; PCT International Application No. PCT/KR2010/001608; Dated Nov. 1, 2010; 5 pages.; International Searching Authority/Korean Intellectual Property Office, Republic of Korea.

*Primary Examiner* — Pankaj Kumar
*Assistant Examiner* — Charles N Hicks
(74) *Attorney, Agent, or Firm* — Murabito, Hao & Barnes LLP; Andrew D. Fortney

(57) ABSTRACT

A hierarchical broadcasting device and method are disclosed. In the hierarchical broadcasting method, a broadcast transmitting device may transmit lower layer broadcast data for an existing broadcast to a broadcast receiving device via a first communication network, and may transmit upper layer broadcast data for an improved broadcast to the broadcast receiving device via a second communication network. In this instance, the broadcast receiving device combines the lower layer broadcast data and the upper layer broadcast data in order to display the improved broadcast.

17 Claims, 4 Drawing Sheets

DEVICE AND METHOD FOR HIERARCHICAL BROADCASTING

TECHNICAL FIELD

The present invention relates to a hierarchical broadcasting device and method, and more particularly, to a device and method that may provide a hierarchical broadcast using heterogeneous networks or an identical network.

BACKGROUND ART

Schemes of transmitting a terrestrial digital broadcast includes Advance Television System Committee (ATSC) 8-Vestigial Side Band (8-VSB) standards used in the United States, Digital Video Broadcasting-Terrestrial (DVB-T) standards used in Europe, Integrated Service Digital Broadcasting-Terrestrial (ISDB-T) standards used in Japan, and the like. According to the ATSC standards used in the United States, approximately 20 Mega bits per second (Mbps) of data is transmitted in a 6 Megahertz (MHz) bandwidth which contains a single channel of the analog National Television System Committee (NTSC), and accordingly a high-definition television (HDTV) broadcasting with a high resolution may be supported.

Although the terrestrial digital broadcast provides a higher resolution in comparison to an analog broadcast, a demand for a more improved broadcast is still increasing. However, it is not easy for a current broadcast to provide an improved broadcast due to lack of frequencies, and a compatibility problem with existing broadcast devices.

Accordingly, there is a desire for a broadcasting device and method that may secure a compatibility with the current broadcasting device, and may also support an improved broadcast.

DISCLOSURE OF INVENTION

Technical Goals

An aspect of the present invention provides a broadcasting device and method that may secure a compatibility with a broadcasting device currently used, and may simultaneously support an improved broadcast, by providing a hierarchical broadcast using heterogeneous networks or an identical network.

Another aspect of the present invention provides a broadcasting device and method that may secure a compatibility with a broadcasting device currently used, and may simultaneously support an improved broadcast, in relation to conventional terrestrial broadcasting, mobile broadcasting, satellite broadcasting, and the like.

Technical Solutions

According to an aspect of the present invention, there is provided a hierarchical broadcasting device, including a first encoder to generate a first encoding signal by encoding first broadcast data using a first encoding scheme, a first transmitter to transmit the first encoding signal via a first communication network, a decoder to generate second broadcast data by decoding the first encoding signal, a residual signal generator to generate a residual signal using the first broadcast data and the second broadcast data, a second encoder to generate a second encoding signal by encoding the residual signal using a second encoding scheme, and a second transmitter to transmit the second encoding signal via a second communication network.

According to another aspect of the present invention, there is provided a hierarchical broadcasting method, including transmitting, by a broadcast transmitting device, first broadcast data for a broadcast to a broadcast receiving device via a first communication network, and transmitting, by the broadcast transmitting device, second broadcast data for an improved broadcast to the broadcast receiving device via a second communication network.

Effect of Invention

According to an aspect of the present invention, a hierarchical broadcasting device and method may secure a compatibility with a broadcasting device currently used, and may simultaneously support an improved broadcast, by providing a hierarchical broadcast using heterogeneous networks or an identical network.

BEST MODE FOR CARRYING OUT THE INVENTION

Figure 1:
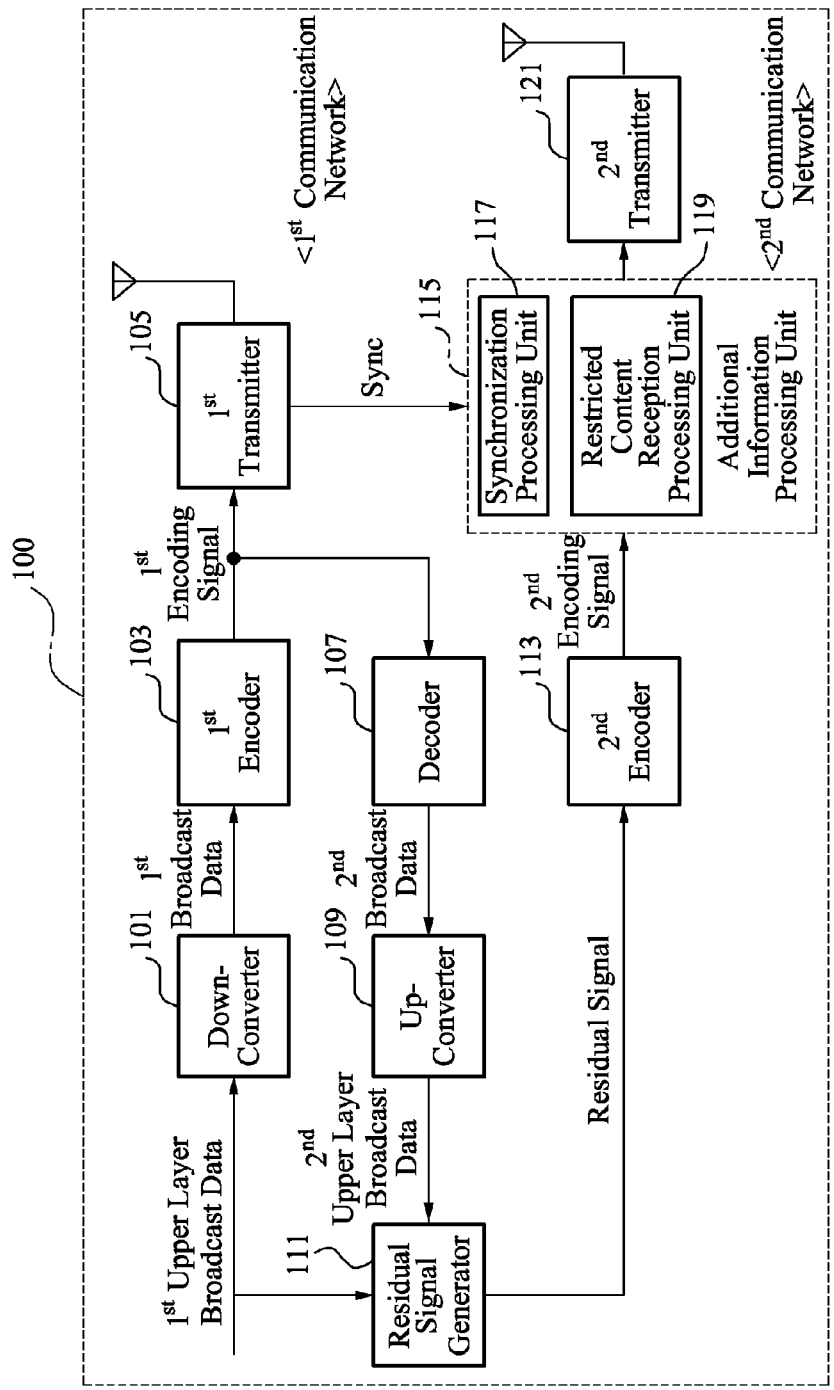
FIGS. 1 and 2 are diagrams illustrating configurations of a hierarchical broadcasting device according to embodiments of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

According to a basic principle for supporting an improved broadcast in the present invention, a broadcast transmitting device may transmit, to a broadcast receiving device, lower layer broadcast data for an existing broadcast via a first communication network, and may transmit, to the broadcast receiving device, upper layer broadcast data for an improved broadcast via a second communication network. Here, the second communication network may correspond to a network different from the first communication network, or a network identical to the first communication network. The broadcast receiving device may combine the lower layer broadcast data and the upper layer broadcast data in order to display the improved broadcast.

FIG. 1 is a diagram illustrating a configuration of a hierarchical broadcasting device 100 according to embodiments of the present invention.

The hierarchical broadcasting device 100 may be applied to a broadcast transmitting device, and accordingly the hierarchical broadcasting device 100 may also be referred to as a hierarchical broadcast transmitting device 100.

Referring to FIG. 1, the hierarchical broadcast transmitting device 100 may include a down-converter 101, a first encoder 103, a first transmitter 105, a decoder 107, an up-converter 109, a residual signal generator 111, a second encoder 113, an additional information processing unit 115, and a second transmitter 121.

The down-converter 101 may generate lower layer broadcast data by down-converting input broadcast data. That is, the down-converter 101 may generate first broadcast data corresponding to lower layer broadcast data in comparison to first upper layer broadcast data, by down-converting the first upper layer broadcast data. In this instance, the down-converter 101 may generate the lower layer broadcast data by adjusting or bypassing a resolution, a frame rate, a progressive method, a bit depth, a sampling rate of the broadcast data, and the like. For example, the down-converter 101 may generate lower layer broadcast data having a 2K resolution corresponding to 1920×1080, by down-converting a resolution of super high resolution broadcast data having a 4K resolution corresponding to 3840×2160 or an 8K resolution corresponding to 7680×4320. Also, the down-converter 101 may generate lower layer broadcast data corresponding to 60i, by down-converting a progressive method of broadcast data corresponding to 60p. In a case of digital multimedia broadcasting (DMB) that is portable mobile broadcasting, the down-converter 101 may down-convert a Video Graphics Array (VGA) resolution corresponding to 640×480 to a Quarter Video Graphics Array (QVGA) corresponding to 320×240, or may down-convert 60p to 30p.

The first encoder 103 may generate a first encoding signal by encoding the first broadcast data output from the down-converter 101 using a first encoding scheme. Here, the first encoding scheme may correspond to, however may not be limited to an encoding scheme compliant with Moving Picture Experts Group (MPEG)-2 standards. For example, when DMB broadcasting is supported, the first encoding scheme may correspond to an encoding scheme compliant with MPEG-4 Advanced Video Coding (AVC) standards.

The first transmitter 105 may transmit the first encoding signal output from the first encoder 103 via a first communication network. Here, the first communication network may correspond to a broadcast network used for broadcasting a broadcast signal. For example, the first communication network may correspond to, however may not be limited to a broadcast network compliant with Advance Television System Committee (ATSC) standards that may support digital broadcasting. The first communication network may also correspond to a communication network that may support mobile broadcasting or satellite broadcasting.

Also, the first transmitter 105 may transfer synchronization information with the first encoding signal to the additional information processing unit 115.

The decoder 107 may generate second broadcast data by decoding the first encoding signal output from the first encoder 103. Here, a decoding scheme may correspond to, however may not be limited to a decoding scheme compliant with the MPEG-2 standards.

The up-converter 109 may generate upper layer broadcast data by up-converting input broadcast data. That is, the up-converter 109 may generate second upper layer broadcast data by up-converting second broadcast data In this instance, the up-converter 109 may generate the upper layer broadcast data by adjusting or bypassing a resolution, a frame rate, a progressive method, a bit depth, a sampling rate of the broadcast data, and the like. For example, the up-converter 109 may generate upper layer super high resolution broadcast data having a 4K resolution corresponding to 3840×2160 or an 8K resolution corresponding to 7680×4320, by up-converting a resolution of high resolution broadcast data having a 2K resolution corresponding to 1920×1080. Also, the up-converter 109 may generate upper layer broadcast data corresponding to 60p, by up-converting a progressive method of broadcast data corresponding to 60i. In a case of DMB that is portable mobile broadcasting, the up-converter 109 may up-convert a QVGA corresponding to 320×240 to a VGA resolution corresponding to 640×480, or may up-convert 30p to 60p.

The residual signal generator 111 may generate a residual signal using the first upper layer broadcast data and the second upper layer broadcast data. In this instance, the residual signal generator 111 may generate the residual signal using a difference between the first upper layer broadcast data and the second upper layer broadcast data. Here, the second upper layer broadcast data may correspond to broadcast data restored by performing down-converting and encoding for the first upper layer broadcast data, and by performing decoding and up-converting for the encoded data.

The second encoder 113 may generate a second encoding signal by encoding the residual signal, output from the residual signal generator 111, between the first upper layer broadcast data and the second upper layer broadcast data using a second encoding scheme. Here, the second encoding scheme may have a much higher coding efficiency when compared to the first encoding scheme. The second encoding scheme may correspond to, however may not be limited to, an encoding scheme compliant with H.264 standards.

The additional information processing unit 115 may include a synchronization processing unit 117, and a restricted content reception processing unit 119.

The synchronization processing unit 117 may receive, from the first transmitter 105, synchronization information with the first encoding signal, and may process the synchronization information using a scheme of inserting the synchronization information with the first encoding signal to the second encoding signal, and the like.

The restricted content reception processing unit 119 may encrypt the second encoding signal using a secret key, or may scramble the second encoding signal using a scramble code so that only a service subscriber may be provided with contents.

The second transmitter 121 may transmit the second encoding signal output from the additional information processing unit 115 via a second communication network. Here, the second communication network may correspond to a network different from the first communication network, for example, a network-based Internet network, or may correspond to a network identical to the first communication network.

At least one of the first encoding signal output from the first transmitter 105 and the second encoding signal output from the second transmitter 121 may include information indicating that a broadcast corresponds to a hierarchical broadcast service. In this instance, the first encoding signal and the second encoding signal may be simultaneously transmitted, sequentially transmitted, or transmitted in staggered time intervals.

Figure 2:
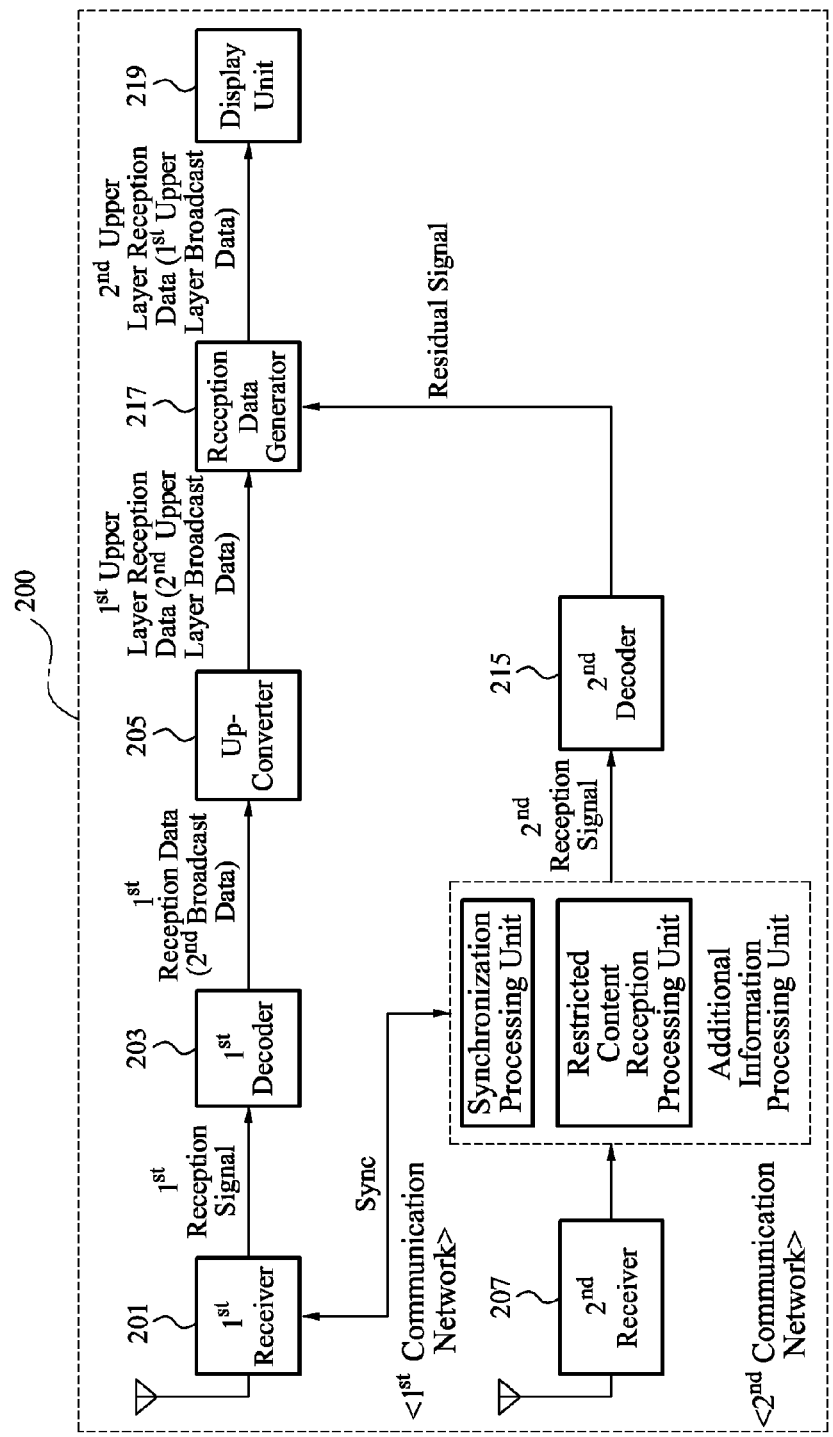

FIG. 2 is a diagram illustrating a configuration of another hierarchical broadcasting device 200 according to embodiments of the present invention.

The hierarchical broadcasting device 200 may be applied to a broadcast receiving device, and accordingly the hierarchical broadcasting device 200 may also be referred to as a hierarchical broadcast receiving device 200.

Referring to FIG. 2, the hierarchical broadcast receiving device 200 may include a first receiver 201, a first decoder 203, an up-converter 205, a second receiver 207, an additional information processing unit 209, a second decoder 215, a reception data generator 217, and a display unit 219.

The first receiver 201 may receive a first reception signal transmitted via a first communication network. Here, the first communication network may correspond to a broadcast network used for receiving a broadcasted broadcast signal. For example, the first communication network may correspond to, however may not be limited to a broadcast network compliant with the ATSC standards that may support digital broadcasting. The first communication network may also correspond to a communication network that may support mobile broadcasting or satellite broadcasting.

The first decoder 203 may generate first reception data by decoding the first reception signal using a first decoding scheme. Here, the first reception data may be identical to second broadcast data obtained by performing down-converting and encoding for first upper layer broadcast data, and performing decoding for the encoded data in the broadcast transmitting device 100 of FIG. 1. The first decoding scheme may correspond to, however may not be limited to a decoding scheme compliant with MPEG-2 standards. For example, when a DMB broadcast is supported, the first decoding scheme may correspond to a decoding scheme compliant with MPEG-4 AVC standards.

The up-converter 205 may generate first upper layer reception data by up-converting the first reception data corresponding to an output signal of the first decoder 203. Here, since the first reception data corresponds to the second broadcast data in the broadcast transmitting device 100, the first upper layer first reception data may correspond to second upper layer broadcast data in the broadcast transmitting device 100. In this instance, the up-converter 205 may be identical to the up-converter 109 of the broadcast transmitting device 100. The up-converter 205 may generate upper layer broadcast data by adjusting or bypassing a resolution, a frame rate, a progressive method, a bit depth, a sampling rate of the broadcast data, and the like.

The second receiver 207 may receive a second reception signal transmitted via a second communication network. Here, the second communication network may correspond to a network different from the first communication network, for example, a network-based Internet network, or may correspond to a network identical to the first communication network. At least one of the first reception signal and the second reception signal may include information indicating that a broadcast corresponds to a hierarchical broadcast service.

The additional information processing unit 209 may include a synchronization processing unit 211, and a restricted content reception processing unit 213.

The synchronization processing unit 211 may extract, from the second reception signal, synchronization information with the first reception signal received by the first receiver 201.

The restricted content reception processing unit 213 may decrypt the second reception signal using the same secret key used for the encryption performed by the restricted content reception processing unit 119 of FIG. 1, or may descramble the second reception signal using the same scramble code used for the scramble performed by the restricted content reception processing unit 119. The secret key or the scramble code may be provided when subscribing to a service.

The second reception signal output from the additional information processing unit 209 may be stored in a buffer (not shown) in conjunction with the first reception signal, and may be output from the buffer according to synchronization information.

The second decoder 215 may restore a residual signal between the first reception data and second reception data by decoding the second reception signal using a second decoding scheme. Here, the residual signal between the first reception data and the second reception data may correspond to a residual signal between the first upper layer reception data and the second upper layer reception data. The residual signal between the first upper layer reception data and the second upper layer reception data may be identical to a residual signal between first upper layer broadcast data and second upper layer broadcast data in the broadcast transmitting device 100. The second decoding scheme may have a much higher decoding efficiency in comparison to the first decoding scheme of the first decoder 203. The second decoding scheme may correspond to, however may not be limited to, a decoding scheme compliant with H.264 standards.

The reception data generator 217 may generate the second reception data using an output signal of the up-converter 205 and an output signal of the second decoder 215. That is, the reception data generator 217 may generate the second upper layer reception data by combining the first upper layer reception data corresponding to the output signal of the up-converter 205, and the residual signal between the first upper layer reception data and the second upper layer reception data, corresponding to the output signal of the second decoder 215.

The display unit 219 may display the second upper layer reception data corresponding to an output signal of the reception data generator 217. Here, the second upper layer reception data may correspond to first upper layer broadcast data desired to be provided by the broadcast transmitting device 100.

The hierarchical broadcasting device according to embodiments of the present invention may support an improved broadcast by adjusting a resolution, a frame rate, a progressive method, a bit depth, a sampling rate of the broadcast data, and the like, using an up-converter and a down-converter. Also, the hierarchical broadcasting device may provide a clearer resolution through a hierarchical broadcast, by transmitting and receiving an additional signal of the broadcast data via a second communication network discriminated a first communication network, using two heterogeneous networks, or an identical network. Here, the additional signal may include for example, a residual signal between broadcast data. This may be selectively provided by preserving contents or by charging fees using a property of network transmission. Additionally, the hierarchical broadcast transmitting device according to embodiments of the present invention may transmit existing broadcast data via the first communication network, and accordingly a conventional broadcast receiving device that fails to provide an improved broadcast may display the improved broadcast using only the existing broadcast data. Thus, the hierarchical broadcast transmitting device may secure a compatibility with the conventional broadcast receiving device, and may also support the improved broadcast. Here, the improved broadcast may correspond to at least one of a digital television (DTV) broadcast with an improved resolution and video quality, an improved mobile TV broadcast, an improved satellite broadcast, and an improved cable broadcast.

Figure 3:
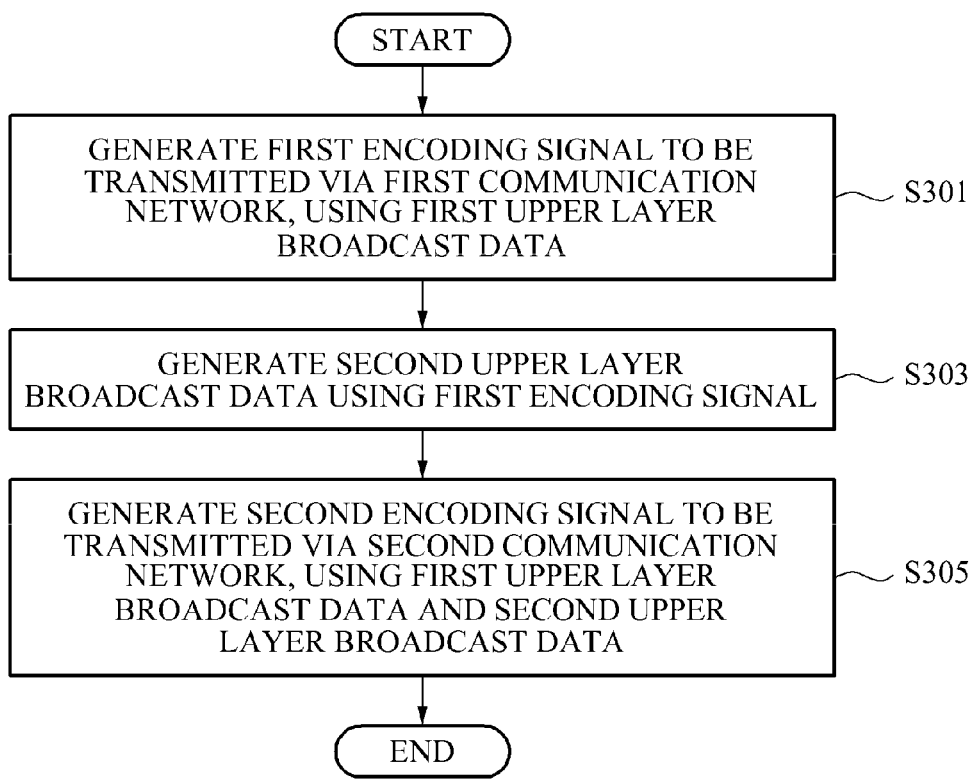
FIG. 3 is a flowchart illustrating a method of transmitting a hierarchical broadcast according to embodiments of the present invention.

FIG. 3 is a flowchart illustrating a method of transmitting a hierarchical broadcast according to embodiments of the present invention.

Referring to FIG. 3, in operation S301, a hierarchical broadcast transmitting device may generate a first encoding signal to be transmitted via a first communication network, using first upper layer broadcast data.

Specifically, the hierarchical broadcast transmitting device may generate first broadcast data by down-converting the first upper layer broadcast data to be lower layer broadcast data. In this instance, the hierarchical broadcast transmitting device may generate the lower layer broadcast data by adjusting a resolution, a frame rate, a progressive method, a bit depth, a sampling rate of the broadcast data, and the like.

The hierarchical broadcast transmitter may generate a first encoding signal by encoding first broadcast data using a first encoding scheme, and transmit the generated first encoding signal via a first communication network. There, the first communication network may correspond to a broadcast network used for broadcasting a broadcast signal. For example, the first communication network may correspond to, however may not be limited to a broadcast network compliant with ATSC standards that may support digital broadcasting. The first communication network may also correspond to a communication network that may support mobile broadcasting or satellite broadcasting.

In operation S303, the hierarchical broadcast transmitting device may generate second upper layer broadcast data using the first encoding signal.

Specifically, the hierarchical broadcast transmitting device may generate second broadcast data by decoding the first encoding signal, and generate the second upper layer broadcast data by up-converting the second broadcast data. In this instance, the hierarchical broadcast transmitting device may generate upper layer broadcast data by adjusting a resolution, a frame rate, a progressive method, a bit depth, a sampling rate of the broadcast data, and the like.

In operation S305, the hierarchical broadcast transmitting device may generate a second encoding signal to be transmitted via a second communication network, using the first upper layer broadcast data and the second upper layer broadcast data.

Specifically, the hierarchical broadcast transmitting device may generate a residual signal using a difference between the first upper layer broadcast data and the second upper layer broadcast data, and may generate the second encoding signal by encoding the generated residual signal using a second encoding scheme. In this instance, the second encoding scheme may have a much higher coding efficiency when compared to the first encoding scheme.

The hierarchical broadcast transmitting device may insert synchronization information with the first encoding signal into the second encoding signal, encrypt or scramble the second encoding signal, and transmit the second encoding signal via the second communication network. Here, the second communication network may correspond to a network different from the first communication network, for example, a network-based Internet network, or may correspond to a network identical to the first communication network.

The hierarchical broadcast transmitting device may simultaneously transmit the first encoding signal transmitted via the first communication network, and the second encoding signal transmitted via the second communication network, and may also sequentially transmit the first encoding signal and the second encoding signal, or may transmit the first encoding signal and the second encoding signal with a time interval. Also, at least one of the first encoding signal and the second encoding signal to be transmitted may include information that a broadcast corresponds to a hierarchical broadcast service.

Figure 4:
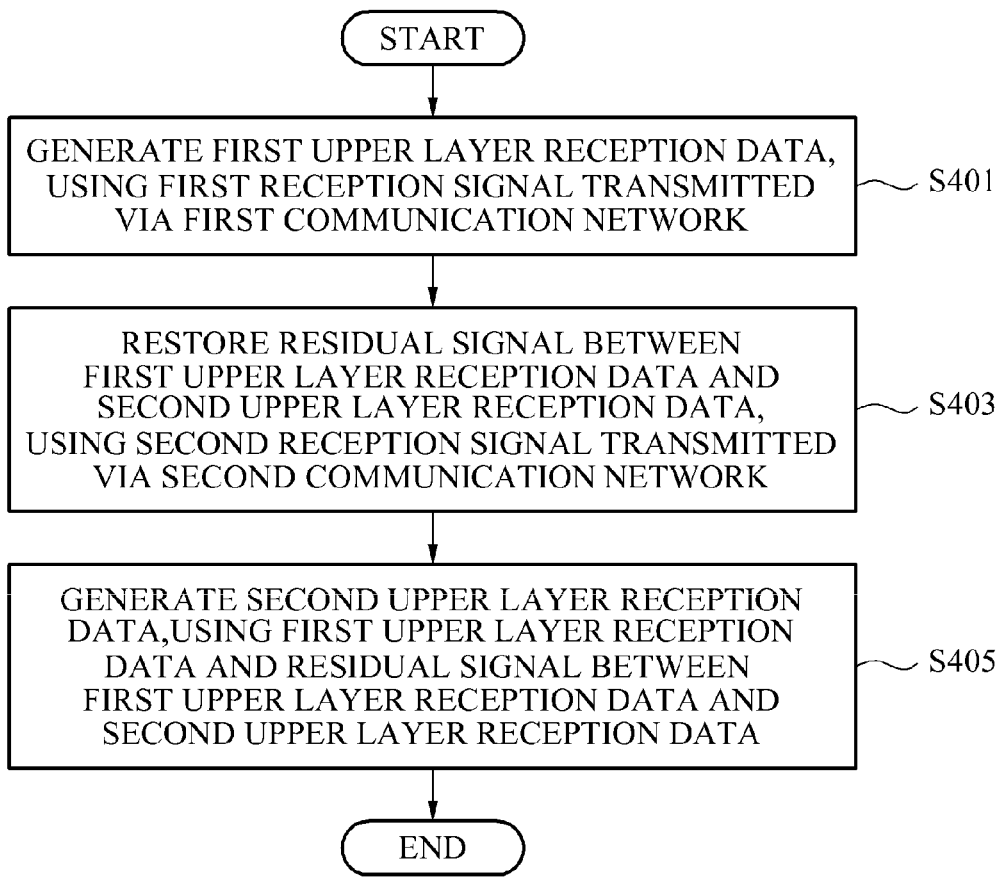
FIG. 4 is a flowchart illustrating a method of receiving a hierarchical broadcast according to embodiments of the present invention.

FIG. 4 is a flowchart illustrating a method of receiving a hierarchical broadcast according to embodiments of the present invention.

Referring to FIG. 4, in operation S401, a hierarchical broadcast receiving device may generate first upper layer reception data using a first receiving signal transmitted via a first communication network.

Specifically, the hierarchical broadcast receiving device may generate first reception data by decoding the first reception signal transmitted via a broadcast network, and may generate the first upper layer reception data by up-converting the generated first reception data. In this instance, the hierarchical broadcast receiving device may generate upper layer reception data by adjusting a resolution, a frame rate, a progressive method, a bit depth, a sampling rate of the broadcast data, and the like. Here, the first reception data may correspond to second broadcast data in a broadcast transmitting device.

In operation S403, the hierarchical broadcast receiving device may restore a residual signal between first upper layer reception data and second upper layer reception data, using a second reception signal transmitted via a second communication network.

Specifically, the hierarchical broadcast receiving device may extract synchronization information with the first reception signal transmitted via the first communication network from the second reception signal transmitted via the second communication network, or may decrypt or descramble the second reception signal. In this instance, the second communication network may correspond to a network different from the first communication network, for example, a network-based Internet network, or may correspond to a network identical to the first communication network.

The hierarchical broadcast reception device may restore the residual signal between the first upper layer reception data and the second upper layer reception data by decoding the second reception signal using a second decoding scheme. Here, the residual signal between the first upper layer reception data and the second upper layer reception data may correspond to a residual signal between first upper layer broadcast data and second upper layer broadcast data in the broadcast transmitting device. The second decoding scheme may have a much higher decoding efficiency in comparison to the first decoding scheme.

In operation S405, the hierarchical broadcast receiving device may restore the second upper layer reception data using the first upper layer reception data and the residual signal.

Specifically, the hierarchical broadcast receiving device may restore the second upper layer reception data by combining the first upper layer reception data and the residual signal between the first upper layer reception data and the second upper layer reception data. Then, the hierarchical broadcast receiving device may display the second upper layer reception data. That is, the hierarchical broadcast receiving device may display the second upper layer reception data corresponding to first upper layer broadcast data desired to be provided, thereby providing a broadcast service improved more than an existing broadcast.

The hierarchical broadcast receiving device may simultaneously receive the first reception signal transmitted via the first communication network, and the second reception signal transmitted via the second communication network, and may also sequentially receive the first reception signal and the second reception signal, or may receive the first reception signal and the second reception signal with a time interval. Also, at least one of the first reception signal and the second reception signal may include information that a broadcast corresponds to a hierarchical broadcast service.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A hierarchical broadcast transmitting device comprising:
   a first encoder to generate a first encoding signal by encoding first broadcast data using a first encoding scheme;
   a first transmitter to transmit the first encoding signal via a first communication network;
   a decoder to generate second broadcast data by decoding the first encoding signal;
   a residual signal generator to generate a residual signal using the first broadcast data and the second broadcast data;
   a second encoder to generate a second encoding signal by encoding the residual signal using a second encoding scheme; a restricted content reception processing unit to only encrypt the second encoding signal or scramble the second encoding signal; and a second transmitter to transmit the second encoding signal via a second communication network.

2. The hierarchical broadcast transmitting device of claim 1, wherein the first communication network corresponds to a broadcast network used for broadcasting a broadcast signal.

3. The hierarchical broadcast transmitting device of claim 1, wherein the second communication network corresponds to a network different from the first communication network, or a network identical to the first communication network.

4. The hierarchical broadcast transmitting device of claim 1, wherein the second encoding scheme corresponds to an encoding scheme with a much higher coding efficiency in comparison to the first encoding scheme.

5. The hierarchical broadcast transmitting device of claim 1, further comprising:
   a synchronization processing unit to insert synchronization information with the first encoding signal into the second encoding signal.

6. The hierarchical broadcast transmitting device of claim 1, wherein at least one of the first encoding signal and the second encoding signal includes information indicating that a broadcast corresponds to a hierarchical broadcast service.

7. The hierarchical broadcast transmitting device of claim 1, further comprising:
   a down-converter to generate the first broadcast data by down-converting first upper layer broadcast data; and
   an up-converter to generate second upper layer broadcast data by up-converting the second broadcast data, and to provide the second upper layer broadcast data for the residual signal generator,
   wherein the residual signal generator generates a residual signal using the first upper layer broadcast data and the second upper layer broadcast data.

8. A hierarchical broadcast receiving device comprising:
   a first receiver to receive a first reception signal that is transmitted via a first communication network;
   a first decoder to generate first reception data by decoding the first reception signal using a first decoding scheme;
   a second receiver to receive a second reception signal that is transmitted via a second communication network;
   a second decoder to generate a residual signal between the first reception data and second reception data, by decoding the second reception signal using a second decoding scheme; a restricted content reception processing unit to only decrypt the second encoding signal or descramble the second encoding signal; and a reception data generator
   to generate the second reception data using the first reception data and the residual signal.

9. The hierarchical broadcast receiving device of claim 8, wherein the first communication network corresponds to a broadcast network used for broadcasting a broadcast signal.

10. The hierarchical broadcast receiving device of claim 8, wherein the second communication network is a network different from the first communication network, or a network identical to the first communication network.

11. The hierarchical broadcast receiving device of claim 8, wherein the second decoding scheme corresponds to a decoding scheme with a much higher decoding efficiency in comparison to the first decoding scheme.

12. The hierarchical broadcast receiving device of claim 8, further comprising:
   a restricted content reception processing unit to decrypt the second reception signal, or to descramble the second reception signal.

13. The hierarchical broadcast receiving device of claim 8, further comprising:
   a synchronization processing unit to extract synchronization information with the first reception signal from the second reception signal.

14. The hierarchical broadcast receiving device of claim 8, wherein at least one of the first reception signal and the second reception signal includes information indicating that a broadcast corresponds to a hierarchical broadcast service.

15. The hierarchical broadcast receiving device of claim 8, further comprising:
   an up-converter to up-convert an output signal of the first decoder,
   wherein, when the second decoder generates a residual signal between first upper layer reception data and second upper layer reception data,
   the up-converter generates the first upper layer reception data by up-converting the first reception data output from the first decoder, and
   the reception data generator generates the second upper layer reception data using the first upper layer reception data, and a residual signal between the first upper layer reception data and the second upper layer reception data.

16. A hierarchical broadcasting method comprising:
   transmitting, by the hierarchical broadcast transmitting device of claim 1, lower layer broadcast data for an existing broadcast to a broadcast receiving device via a first communication network; and
   transmitting, by the broadcast transmitting device, upper layer broadcast data for an improved broadcast to the broadcast receiving device via a second communication network.

17. The hierarchical broadcasting method of claim 16, further comprising:
   combining, by the broadcast receiving device, the lower layer broadcast data and the upper layer broadcast data in order to display the improved broadcast.

* * * * *